(12) United States Patent
Li et al.

(10) Patent No.: US 7,742,129 B2
(45) Date of Patent: Jun. 22, 2010

(54) COLOR FILTER SUBSTRATE AND MANUFACTURING METHOD THEREOF AND LIQUID CRYSTAL DISPLAY PANEL

(75) Inventors: De-Jiun Li, Taipei County (TW); Shin-Cheng Chang, Taipei County (TW); Yu-Chen Liu, Taipei (TW); Kuo-Ching Chou, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 181 days.

(21) Appl. No.: 12/056,251

(22) Filed: Mar. 26, 2008

(65) Prior Publication Data
US 2009/0033841 A1 Feb. 5, 2009

(30) Foreign Application Priority Data
Jul. 30, 2007 (TW) .............................. 96127755 A

(51) Int. Cl.
*G02F 1/1335* (2006.01)
(52) U.S. Cl. .................. 349/106; 107/110; 107/155; 107/156
(58) Field of Classification Search ............... 349/155, 349/156
See application file for complete search history.

(56) References Cited

U.S. PATENT DOCUMENTS

| 6,671,025 | B1 | 12/2003 | Ikeda et al. | |
| 2006/0290874 | A1* | 12/2006 | Yoon et al. | 349/158 |
| 2007/0171337 | A1* | 7/2007 | Kim et al. | 349/110 |

FOREIGN PATENT DOCUMENTS

| JP | 56140324 | 11/1981 |
| JP | 10-268357 | 10/1998 |
| TW | 1251687 | 3/2006 |

* cited by examiner

*Primary Examiner*—Richard H Kim
(74) *Attorney, Agent, or Firm*—Jianq Chyun IP Office

(57) ABSTRACT

A manufacturing method of a color filter substrate is provided. In the method, a substrate is provided. A first color layer, a second color layer, and a third color layer are then sequentially formed on the substrate. At least any two of the first color layer, the second color layer, and the third color layer are partially overlapped to form a number of supporters. Next, a common electrode layer is formed on the substrate to cover the first color layer, the second color layer, the third color layer, and the supporters. A light-shielding layer is then formed on the common electrode layer, and a portion of the light-shielding layer is disposed over the supporters. Based on the manufacturing method of the color filter substrate, fewer masks are required.

18 Claims, 4 Drawing Sheets

COLOR FILTER SUBSTRATE AND MANUFACTURING METHOD THEREOF AND LIQUID CRYSTAL DISPLAY PANEL

CROSS-REFERENCE TO RELATED APPLICATION

This application claims the priority benefit of Taiwan application serial no. 96127755, filed on Jul. 30, 2007. The entirety of the above-mentioned patent application is hereby incorporated by reference herein and made a part of this specification.

BACKGROUND OF THE INVENTION

1. Field of the Invention

The present invention relates to a semiconductor structure and a manufacturing method thereof. More particularly, the present invention relates to a color filter substrate, a manufacturing method thereof, and a liquid crystal display (LCD) panel.

2. Description of Related Art

By virtue of increasing demands for displays, manufacturers in this industry have endeavored to improve display quality. Among a variety of the displays, a cathode ray tube (CRT) display plays a dominant role due to its great display quality and mature technology. However, compared with other displays, the CRT display not only has disadvantages of high power consumption and high radiation adverse to environmental protection, but also has large product volume, which cannot meet demanding trends of lightness, thinness, shortness, smallness, compactness, and low power consumption in the display market. Therefore, a thin film transistor liquid crystal display (TFT-LCD) having superior properties such as high definition, great space utilization, low power consumption and no radiation gradually becomes a mainstream in the display market.

The TFT-LCD is mainly composed of an LCD panel and a backlight module. Here, the LCD panel is mainly constituted by a thin film transistor (TFT) array substrate, a color filter substrate, and a liquid crystal layer sandwiched between said two substrates. In addition, the backlight module provides a planar light source required by the LCD panel, such that the TFT-LCD is able to perform a display function.

More specifically, the color filter substrate is usually composed of a substrate, a black matrix (BM), a color filter layer, a common electrode layer, a transparent conductive layer, and spacers. Here, the color filter layer includes a green filter layer, a blue filter layer, and a red filter layer.

SUMMARY OF THE INVENTION

The present invention is directed to a manufacturing method of a color filter substrate for simplifying a process of manufacturing the color filter substrate.

The present invention is directed to a color filter substrate for reducing costs.

The present invention is directed to an LCD panel for reducing costs.

The present invention provides a manufacturing method of a color filter substrate. In the method, a substrate is provided. A first color layer, a second color layer, and a third color layer are then sequentially formed on the substrate. At least any two of the first color layer, the second color layer, and the third color layer are partially overlapped to form a plurality of supporters. Next, a common electrode layer is formed on the substrate to cover the first color layer, the second color layer, the third color layer, and the supporters. Thereafter, a light-shielding layer is formed on the common electrode layer, and a portion of the light-shielding layer is disposed over the supporters.

According to an embodiment of the present invention, the first color layer, the second color layer, and the third color layer are partially overlapped, so as to form the supporters.

According to an embodiment of the present invention, the portion of the light-shielding layer further covers the supporters in the step of forming the light-shielding layer.

According to an embodiment of the present invention, a plurality of alignment marks is simultaneously formed on the substrate in the step of forming the first color layer.

According to an embodiment of the present invention, a plurality of alignment marks is simultaneously formed on the substrate in the step of forming the first color layer, the second color layer, the third color layer, or the light-shielding layer. The alignment marks are used for alignment in a panel assembling process.

The present invention further provides a color filter substrate including a substrate, a first color layer, a second color layer, a third color layer, a common electrode layer, and a light-shielding layer. The first color layer and the second color layer are both disposed on the substrate, and the first color layer and the second color layer are partially overlapped, so as to form a plurality of supporters. The third color layer and the common electrode layer are disposed on the substrate, and the common electrode layer covers the first color layer, the second color layer, the third color layer, and the supporters. The light-shielding layer is disposed on the common electrode layer, and a portion of the light-shielding layer is disposed over the supporters.

According to an embodiment of the present invention, a portion of the third color layer is further disposed on an area where the second color layer overlaps the first color layer, so as to form the supporters.

According to an embodiment of the present invention, the portion of the light-shielding layer further covers the supporters.

According to an embodiment of the present invention, a material of the light-shielding layer includes resin.

According to an embodiment of the present invention, the color filter substrate further includes a plurality of alignment marks disposed on the substrate, and the alignment marks and the first color layer are the same film layer.

According to an embodiment of the present invention, the color filter substrate further includes a plurality of alignment marks disposed on the substrate, and the alignment marks may be the same film layer as the first color layer, the second color layer, the third color layer, or the light-shielding layer is. Besides, the alignment marks are used for alignment in a panel assembling process.

The present invention further provides an LCD panel including an opposite substrate, a liquid crystal layer, and a color filter substrate. The liquid crystal layer is sandwiched between the color filter substrate and the opposite substrate. The color filter substrate includes a substrate, a first color layer, a second color layer, a third color layer, a common electrode layer, and a light-shielding layer. The first color layer and the second color layer are both disposed on the substrate, and the first color layer and the second color layer are partially overlapped, so as to form a plurality of supporters. The third color layer and the common electrode layer are disposed on the substrate, and the common electrode layer covers the first color layer, the second color layer, the third color layer, and the supporters. The light-shielding layer is disposed on the common electrode layer, and a portion of the light-shielding layer is disposed over the supporters.

According to an embodiment of the present invention, a portion of the third color layer is further disposed on an area where the second color layer overlaps the first color layer, so as to form the supporters.

According to an embodiment of the present invention, the portion of the light-shielding layer further covers the supporters.

According to an embodiment of the present invention, a material of the light-shielding layer includes resin.

According to an embodiment of the present invention, the color filter substrate further includes a plurality of alignment marks disposed on the substrate, and the alignment marks and the first color layer are the same film layer.

According to an embodiment of the present invention, the color filter substrate further includes a plurality of alignment marks disposed on the substrate, and the alignment marks may be the same film layer as the first color layer, the second color layer, the third color layer, or the light-shielding layer is. Besides, the alignment marks are used for alignment in a panel assembling process.

According to an embodiment of the present invention, the opposite substrate includes an active device array substrate.

In view of the foregoing, the color layers are stacked for forming the supporters in the present invention. Additionally, the light-shielding layer is formed on the common electrode layer at last. Compared with a conventional color filter substrate, the color filter substrate provided by the present invention requires fewer steps in the manufacturing process of the color filter substrate. Moreover, the light-shielding layer is formed over the supporters according to the present invention. Accordingly, the short circuit is more unlikely to occur between the color filter substrate and the opposite substrate.

In order to the make the aforementioned and other features and advantages of the present invention comprehensible, several embodiments accompanied with figures are described in detail below.

DESCRIPTION OF EMBODIMENTS

First Embodiment

Figure 1A:
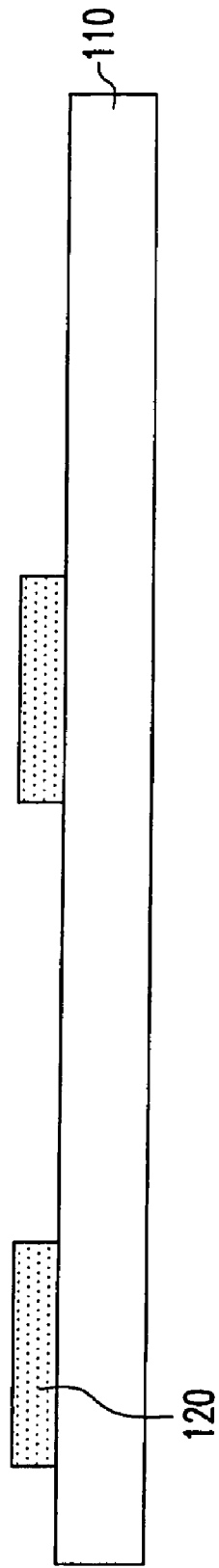
FIGS. 1A to 1E are cross-sectional views illustrating a manufacturing method of a color filter substrate according to a first embodiment of the present invention.

FIGS. 1A to 1E are cross-sectional views illustrating a manufacturing method of a color filter substrate according to a first embodiment of the present invention. Referring to FIG. 1A, the manufacturing method of the color filter substrate of the present embodiment includes the following steps. First, a substrate 110 is provided, and a first color layer 120 is formed thereon. Here, a material of the first color layer 120 includes a photoresist material, and a method of forming the first color layer 120 includes an exposure process and a development process.

Figure 1B:
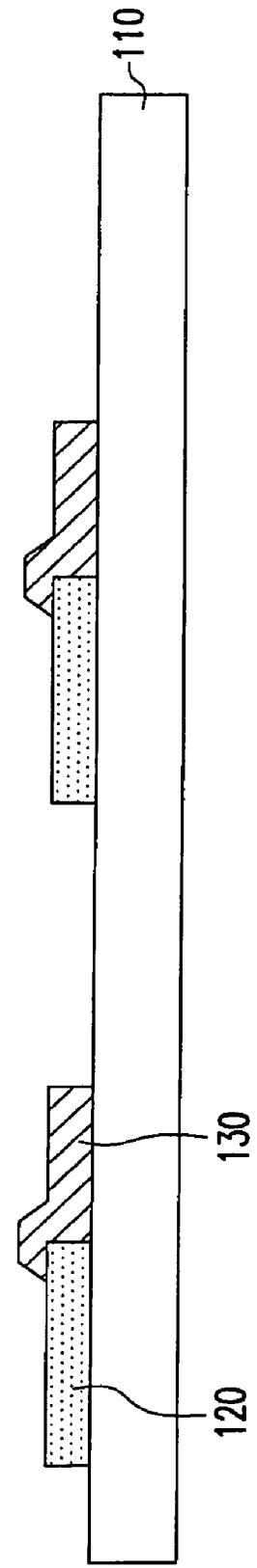

Referring to FIG. 1B, a second color layer 130 is formed on the substrate 110, and the second color layer 130 partially overlaps the first color layer 120. Besides, a method of forming the second color layer 130 is the same as the method of forming the first color layer 120.

Figure 1C:
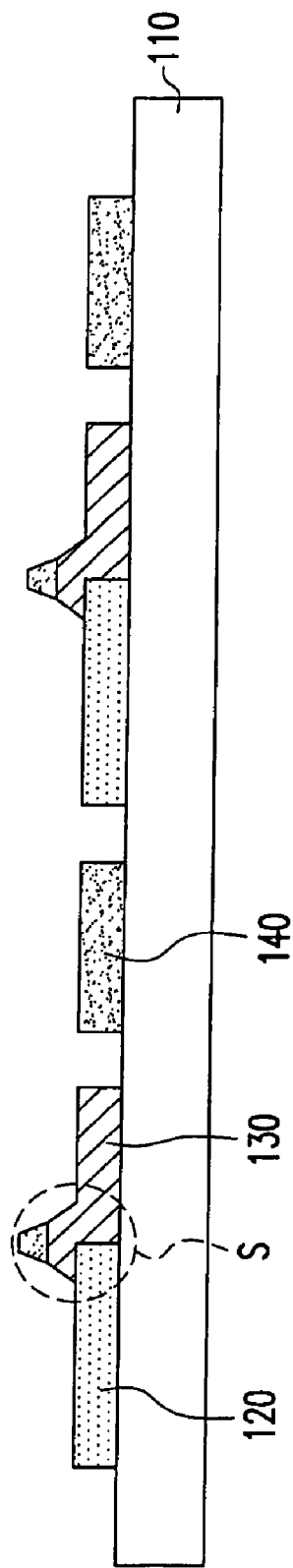

Referring to FIG. 1C, a third color layer 140 is formed on the substrate 110. A portion of the third color layer 140 is disposed on an area where the second color layer 130 overlaps the first color layer 120, so as to form supporters S. Likewise, a method of forming the third color layer 140 is the same as the method of forming the first color layer 120.

Figure 1D:
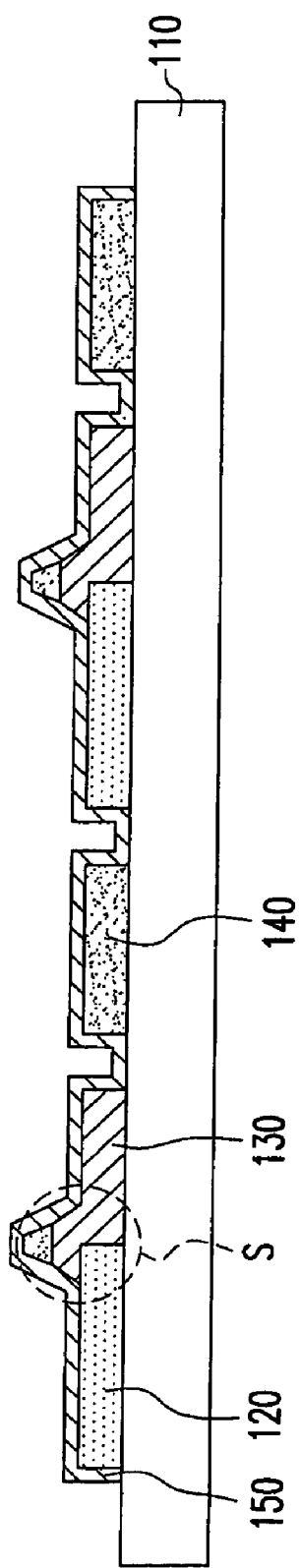

Referring to FIG. 1D, a common electrode layer 150 is formed on the substrate 110 to cover the first color layer 120, the second color layer 130, the third color layer 140, and the supporters S. In addition, a method of forming the common electrode layer 150 includes performing a sputter process, for example.

Figure 1E:
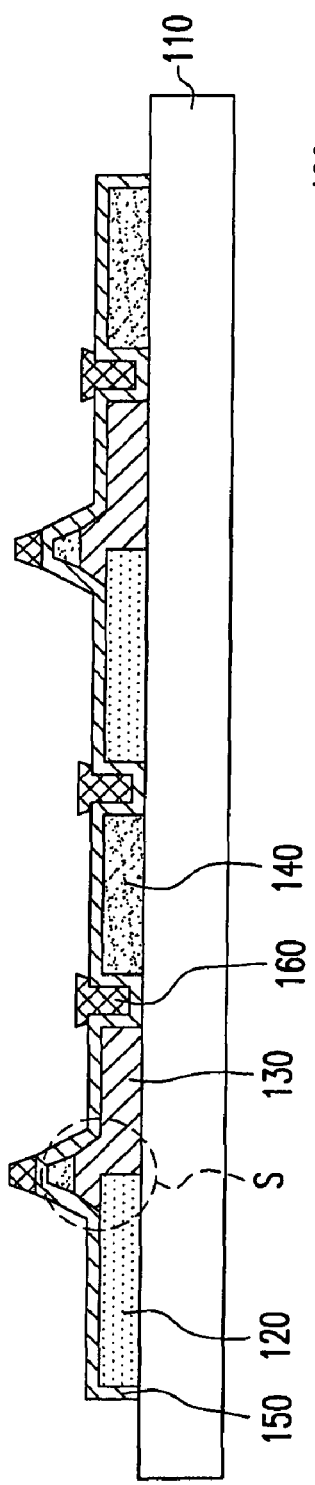

Referring to FIG. 1E, a light-shielding layer 160 is formed on the common electrode layer 150, and a portion of the light-shielding layer 160 is disposed over the supporters S. A material of the light-shielding layer 160 may be metal or resin. As the light-shielding layer 160 is made of resin, a method of forming the light-shielding layer 160 may include the exposure process and the development process. Thereby, the fabrication of the color filter substrate 100 of the present embodiment is approximately completed. The supporters S are formed by stacking the first color layer 120, the second color layer 130 and the third color layer 140. Thus, compared with a conventional color filter substrate, the color filter substrate 100 provided by the present embodiment requires fewer masks in the manufacturing method thereof. A detailed structure of the color filter substrate 100 is elaborated hereinafter.

Referring to FIG. 1E again, the color filter substrate 100 of the present embodiment includes the substrate 110, the first color layer 120, the second color layer 130, the third color layer 140, the common electrode layer 150, and the light-shielding layer 160. The first color layer 120, the second color layer 130 and the third color layer are all disposed on the substrate 110. Besides, the first color layer 120, the second color layer 130, and the third color layer 140 are partially overlapped, so as to form a plurality of the supporters S. The common electrode layer 150 is disposed on the substrate 110 and covers the first color layer 120, the second color layer 130, the third color layer 140, and the supporters S. The light-shielding layer 160 is disposed on the common electrode layer 150, and a portion of the light-shielding layer 160 is disposed over the supporters S.

More specifically, the substrate 110 may be a glass substrate, a quartz substrate or any other transparent substrate, for example. The first color layer 120, the second color layer 130, and the third color layer 140 are, for example, made of the photoresist material. In the present embodiment, the first color layer 120, the second color layer 130, and the third color layer 140 may be a red filter layer, a green filter layer, and a blue filter layer. Nevertheless, the first color layer 120, the second color layer 130, and the third color layer 140 may include other combinations of the three colors or other colors. For example, in the present embodiment, the first color layer 120, the second color layer 130, and the third color layer 140 may be the blue filter layer, the red filter layer, and the green filter layer. Moreover, in the present embodiment, the supporters S are formed by partially stacking the first color layer 120, the second color layer 130, and the third color layer 140, while the supporters S may also be constructed by stacking any two of the first color layer 120, the second color layer 130, and the third color layer 140. Further, the common electrode layer 150 may be made of indium tin oxide (ITO), indium zinc oxide (IZO), or any other transparent metal oxide. The light-shielding layer 160 is, for example, made of resin.

As stated above, the supporters S are formed by stacking the first color layer 120, the second color layer 130, and the third color layer 140, and the light-shielding layer 160 is disposed on the common electrode layer 150 above the supporters S. Therefore, the color filter substrate 100 of the present invention may be fabricated with lower costs.

Figure 2:
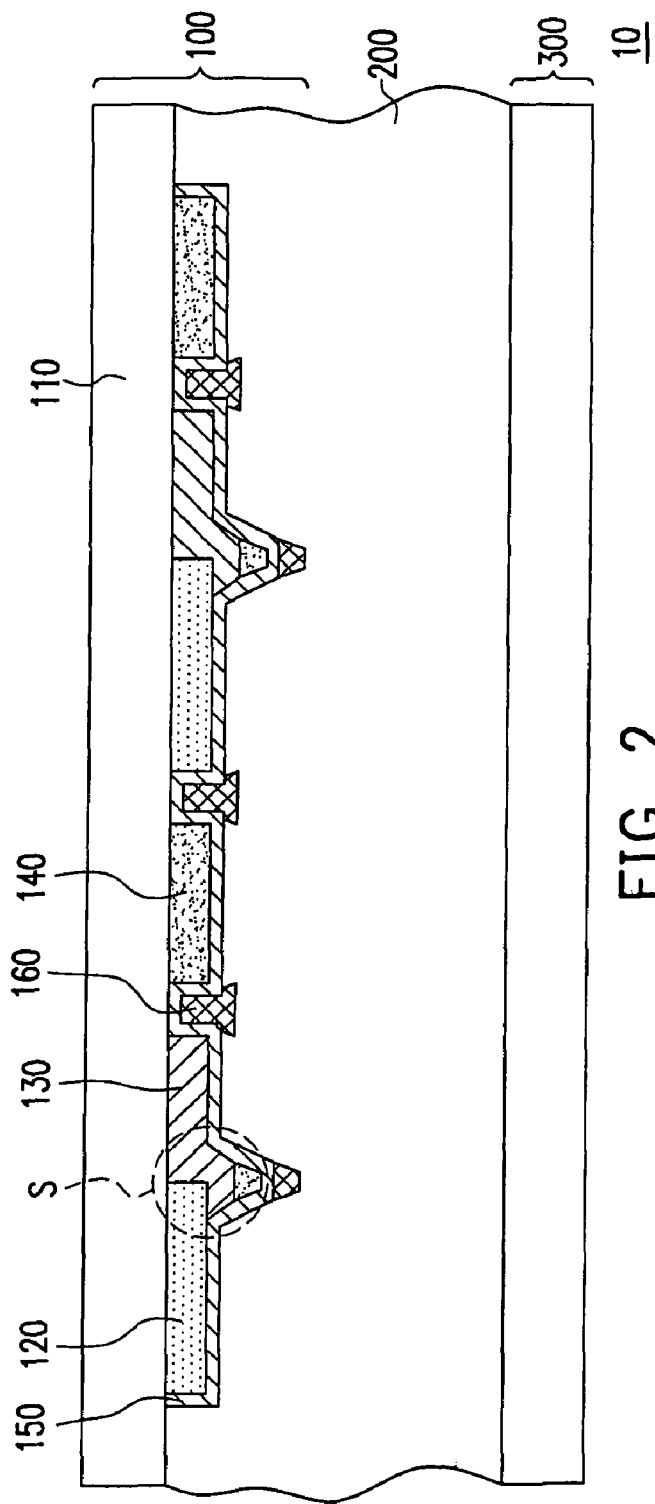
FIG. 2 is a cross-sectional view illustrating an LCD panel according to an embodiment of the present invention.

FIG. 2 is a cross-sectional view illustrating an LCD panel according to an embodiment of the present invention. Referring to FIG. 2, an LCD panel 10 of the present embodiment includes an opposite substrate 300, a liquid crystal layer 200, and the color filter substrate 100. The liquid crystal layer 200 is sandwiched between the color filter substrate 100 and the opposite substrate 300. In addition, the detailed structure of the color filter substrate 100 is described hereinbefore. On the other hand, the opposite substrate 300 may be a TFT array substrate, a diode array substrate, or any other active device array substrate. Providing that the color filter substrate 100 is a color filter on array (COA) substrate, the opposite substrate 300 is an upper substrate having a common electrode. Moreover, the LCD panel 10 of the present embodiment may be employed in a twisted nematic LCD (TN-LCD).

Since a portion of the light-shielding layer 160 is disposed on the common electrode layer 150 above the supporters S, no short circuit takes place between the color filter substrate 100 and the opposite substrate 300 when the color filter substrate 100 is in contact with the opposite substrate 300 because of pressing the LCD panel 10.

Second Embodiment

Figure 3:
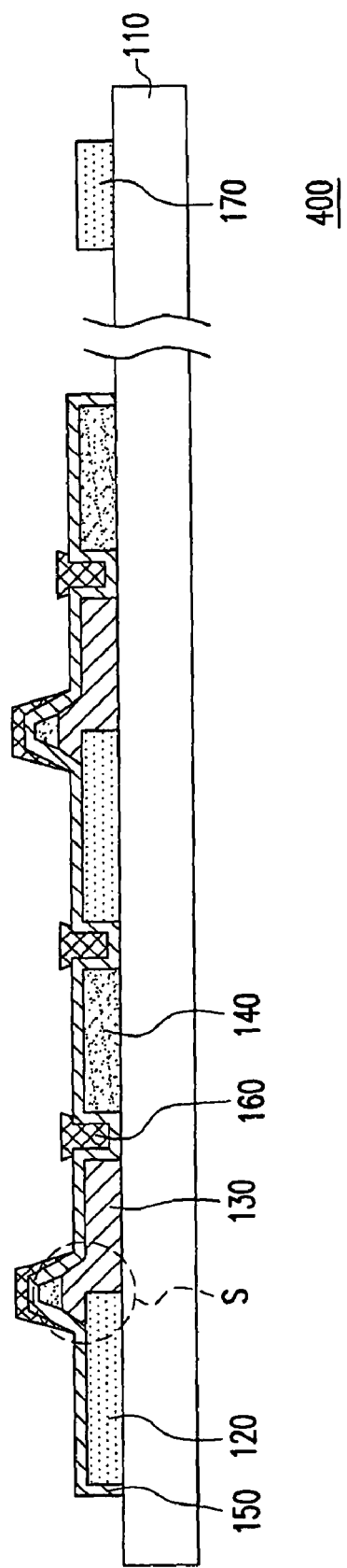
FIG. 3 is a cross-sectional view illustrating a color filter substrate according to a second embodiment of the present invention.

FIG. 3 is a cross-sectional view illustrating a color filter substrate according to a second embodiment of the present invention. Referring to FIG. 3, the present embodiment is similar to the first embodiment, while the difference therebetween lies in that a thickness of the light-shielding layer 160 disposed over the supporters S is not uniform when the light-shielding layer 160 is not precisely formed on the common electrode layer 150 above the supporters S. Accordingly, in a color filter substrate 400 of the present embodiment, the light-shielding layer 160 further covers the supporters S, and thereby the thickness of the light-shielding layer 160 disposed over the supporters S is rather apt to be controlled. Further, as the first color layer 120 is formed, a plurality of alignment marks 170 may be simultaneously formed on the substrate 110, such that the masks may be subsequently aligned. In the present embodiment, the alignment marks 170 and the first color layer 120 are the same film layer. For example, the alignment marks 170 may be composed of the blue filter layer, the red filter layer, or the green filter layer. In another embodiment, however, the alignment marks 170 may be formed before the formation of the first color layer 120. Besides, as the alignment marks 170 are utilized for alignment in a panel assembling process, the alignment marks 170 may also be the same film layer as the first color layer 120, the second color layer 130, the third color layer 140, or the light-shielding layer 160 is.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A manufacturing method of a color filter substrate comprising:
    providing a substrate, wherein a first color layer, a second color layer, and a third color layer are sequentially formed on the substrate, and at least any two of the first color layer, the second color layer, and the third color layer are partially overlapped to form a plurality of supporters;
    forming a common electrode layer on the substrate to cover a portion of the substrate, the first color layer, the second color layer, the third color layer, and the supporters; and
    forming a light-shielding layer on the common electrode layer, wherein a portion of the light-shielding layer is directly disposed on the common electrode at the supporters.

2. The manufacturing method of claim 1, wherein the first color layer, the second color layer, and the third color layer are partially overlapped, so as to form the supporters.

3. The manufacturing method of claim 1, wherein the portion of the light-shielding layer further covers the supporters in the step of forming the light-shielding layer.

4. The manufacturing method of claim 1, wherein a plurality of alignment marks is simultaneously formed in the step of forming the first color layer.

5. The manufacturing method of claim 1, wherein a plurality of alignment marks is simultaneously formed in the step of forming the light-shielding layer.

6. A color filter substrate, comprising:
    a substrate;
    a first color layer disposed on the substrate;
    a second color layer disposed on the substrate and partially overlapping the first color layer for forming a plurality of supporters;
    a third color layer disposed on the substrate;
    a common electrode layer disposed on the substrate and covering a portion of the substrate, the first color layer, the second color layer, the third color layer, and the supporters; and
    a light-shielding layer disposed on the common electrode layer, wherein a portion of the light-shielding layer is directly disposed on the common electrode at the supporters.

7. The color filter substrate of claim 6, wherein a portion of the third color layer is further disposed on an area where the second color layer overlaps the first color layer, so as to form the supporters.

8. The color filter substrate of claim 6, wherein the portion of the light-shielding layer further covers the supporters.

9. The color filter substrate of claim 6, wherein a material of the light-shielding layer comprises resin.

10. The color filter substrate of claim 6, further comprising a plurality of alignment marks disposed on the substrate, the alignment marks and the first color layer being the same film layer.

11. The color filter substrate of claim 6, further comprising a plurality of alignment marks disposed on the substrate, the alignment marks and the light-shielding layer being the same film layer.

12. A liquid crystal display (LCD) panel, comprising:
    a color filter substrate, comprising:
        a substrate;
        a first color layer disposed on the substrate;
        a second color layer disposed on the substrate and partially overlapping the first color layer for forming a plurality of supporters;
        a third color layer disposed on the substrate;

a common electrode layer disposed on the substrate and covering a portion of the substrate, the first color layer, the second color layer, the third color layer, and the supporters;

a light-shielding layer disposed on the common electrode layer, wherein a portion of the light-shielding layer is directly disposed on the common electrode at the supporters;

an opposite substrate; and a liquid crystal layer sandwiched between the opposite substrate and the color filter substrate.

13. The LCD panel of claim 12, wherein a portion of the third color layer is further disposed on an area where the second color layer overlaps the first color layer, so as to form the supporters.

14. The LCD panel of claim 12, wherein the portion of the light-shielding layer further covers the supporters.

15. The LCD panel of claim 12, wherein a material of the light-shielding layer comprises resin.

16. The LCD panel of claim 12, wherein the color filter substrate further comprises a plurality of alignment marks disposed on the substrate, and the alignment marks and the first color layer are the same film layer.

17. The LCD panel of claim 12, wherein the color filter substrate further comprises a plurality of alignment marks disposed on the substrate, and the alignment marks and the light-shielding layer are the same film layer.

18. The LCD panel according to claim 12, wherein the opposite substrate comprises an active device array substrate.

* * * * *